United States Patent [19]

Esserman et al.

[11] Patent Number: 5,115,467
[45] Date of Patent: May 19, 1992

[54] SIGNAL ENCRYPTION APPARATUS FOR GENERATING COMMON AND DISTINCT KEYS

[75] Inventors: James N. Esserman; Christopher J. Bennett, both of San Diego, Calif.

[73] Assignee: General Instrument Corporation, Hatboro, Pa.

[21] Appl. No.: 644,923

[22] Filed: Jan. 23, 1991

[51] Int. Cl.$^5$ ............................................. H04L 9/00
[52] U.S. Cl. ..................................................... 380/44
[58] Field of Search ................... 380/44, 47, 23, 25, 380/20

[56] References Cited

U.S. PATENT DOCUMENTS 4,613,901  9/1986  Gilhousen et al. .
5,016,276  5/1991  Matumoto et al. .................. 380/44

Primary Examiner—Thomas H. Tarcza
Assistant Examiner—David Cain
Attorney, Agent, or Firm—Barry R. Lipsitz

[57] ABSTRACT

Signal encryption apparatus is provided for generating a common key and a distinct key from the same common secret generating key. A generating key is combined with common parameter data to provide a common intermediate key. The common intermediate key is used to produce a common key. The generating key is also combined with distinct parameter data to provide a distinct intermediate key. The distinct intermediate key is used to produce a distinct key. The system has particular applicability to the provision of category and program keys for use in a satellite television scrambling system. The generating key is used to produce the same category key at all uplinks, and different program keys at each uplink.

23 Claims, 2 Drawing Sheets

SIGNAL ENCRYPTION APPARATUS FOR GENERATING COMMON AND DISTINCT KEYS

BACKGROUND OF THE INVENTION

The present invention relates generally to security apparatus for information processing systems, and more particularly to signal encryption apparatus for generating time varying common and distinct keys from a generating key.

There are many schemes available for controlling the remote descrambling of television signals. Such schemes are necessary to maintain security in subscription television systems, including cable television systems and satellite television systems. Typically, a system subscriber is provided with a descrambler connected between a television signal source (e.g., cable feed or satellite receiver) and a television set. Each subscriber's descrambler is remotely accessed by the system operator to enable or disable the receipt of specific services such as the Home Box Office movie channel or special pay-per-view sports events. One problem with such systems is that "pirates" are apt to break the system security and sell "black boxes" that enable the reception of all programming without paying for the services received. It has been difficult and expensive for system operators to contend with the piracy problem.

Various systems have been designed to make piracy more difficult. One such system is disclosed in U.S. Pat. No. 4,613,901 to Gilhousen, et al entitled "Signal Encryption and Distribution System for Controlling Scrambling and Selective Remote Descrambling of Television Signals", incorporated herein by reference. In the Gilhousen, et al system, various cryptographic keys are provided for use in providing an encrypted television signal. Among the keys described are category keys, each common to a different subset of subscriber descramblers. It is also known to provide program keys, in which each television program has a specific key associated therewith that is necessary to descramble the particular program signal.

It is known to generate category keys and program keys as a simple function of time. For example, category keys can be a function of a category epoch start time. The category keys are periodically changed, and at each change the category epoch start time is updated for use in generating the category keys. Similarly, program keys have been generated using a program epoch start time, which is updated each time a new program epoch starts.

The generation of category keys and program keys from corresponding epoch start times may result in insecure keys, in that all inputs are publicly available quantities. Therefore, a system using such an algorithm may be subject to piracy once the category and program keys are ascertained.

It would be advantageous to provide an improved system in which security does not rely on the generation of keys from simple time functions. It would be further advantageous if such a system provided generation of a plurality of keys using a common generating key. Hardware simplification and cost reductions could then be achieved. In addition, it would be advantageous to provide a system wherein the same common keys are generated at different sites without the need for communication between the sites.

The present invention provides signal encryption apparatus having the aforementioned advantages.

SUMMARY OF THE INVENTION

In accordance with the present invention, signal encryption apparatus is provided for generating a common key and a distinct key from a secret generating key. The generating key is combined with a set of common parameter data (e.g., a category number and/or category sequence number) to provide a common intermediate key. First one way function means, coupled to receive the common intermediate key, transform the common intermediate key into a common key. The generating key is also combined with a set of distinct parameter data (e.g., program specific data such as channel number and/or program sequence number) to provide a distinct intermediate key. Second one way function means, coupled to receive the distinct intermediate key, transform the distinct intermediate key into a distinct key.

The signal encryption apparatus is provided at a plurality of different sites, for example, at the uplinks used by different satellite television programmers. All sites are initialized with the same secret generating key and common parameter data. Therefore, the common intermediate keys and common keys are the same at all sites. Each site is initialized with a set of distinct parameter data unique to the site. As a result, the distinct intermediate key and distinct key at each site is unique to the site.

In a preferred embodiment, means are provided for encrypting and storing at least one of the generating, common, and distinct keys with a base key that is local to each site. Where the generating, common, and distinct keys are all encrypted and stored, there will be no need to regenerate these keys for future use.

Typically, the distinct parameter data and common parameter data is changed from time to time. The common data can identify a category of terminals receiving encrypted signals. The distinct data can be specific, for example, to particular signals to be encrypted or to specific signal security techniques used at a site.

DETAILED DESCRIPTION OF THE INVENTION

The present invention provides a new key generation scheme for generating time varying common keys and distinct keys as required. The scheme has particular applicability to the generation of common category keys that are the same for a plurality of sites such as satellite television programmer uplinks, and distinct program keys ("channel keys") that are unique for each different site in an encrypted television signal communication system. An example of a prior art communication system using encrypted category keys and program keys is the VideoCipher II Plus scrambling system manufactured by General Instrument Corporation for use in providing encrypted satellite television communication.

Figure 1:
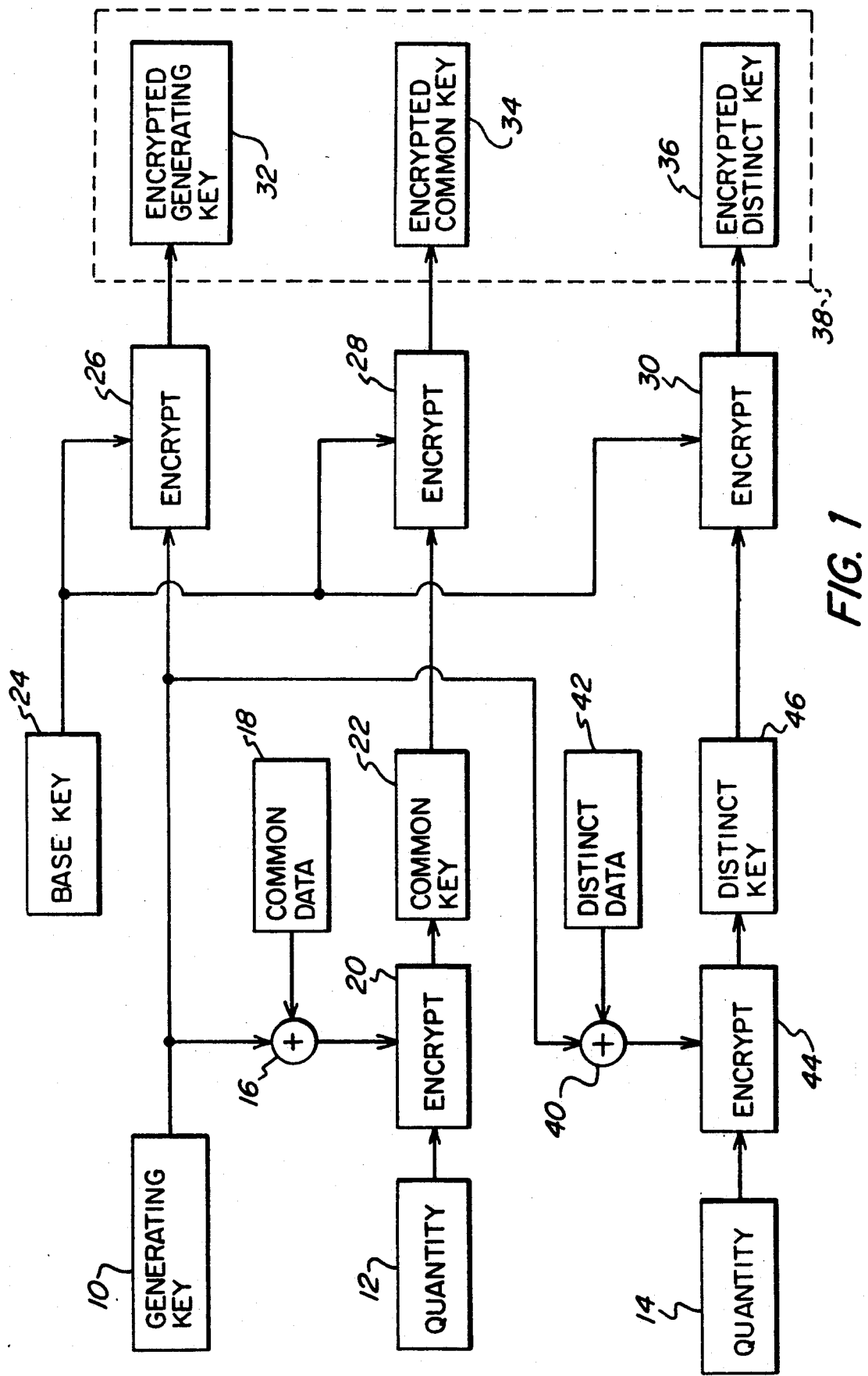
FIG. 1 is a block diagram illustrating a terminal used at a site for generating common and distinct keys from a secret generating key in accordance with the present invention.

Turning to FIG. 1, a common secret generating key 10 is provided in a terminal at each different site. The generating key is encrypted at an encryptor 26 with a base key 24 that is local to each site, and the resultant encrypted generating key 32 is stored in a system memory 38, for example backup tape or electrically alterable read only memory ("EAROM"). Memory 38 backs up the encrypted generating key if the system goes down, and obviates the need to regenerate the key after it is stored.

In accordance with the present invention, generating key 10 is combined at a combiner 16 with common data 18. Combiner 16 can comprise an exclusive OR gate ("XOR") or other well known data combining circuit. Common data 18 can comprise one or more bytes of data common to a particular category to which a signal is communicated. For example, a category of terminals such as subscriber descramblers can each be identified by a category number. A category sequence number can be provided to define an epoch in which the current category number resides. Either or both of the category number and category sequence number can be used as the common data 18 for combination with generating key 10 to distinguish keys both by category and by epoch.

The combination of generating key 10 with common data 18 provides a common intermediate key that is output from combiner 16 and input into a data encryptor 20. The encryptor can use any known encryption function, such as the DES algorithm mentioned in the aforementioned U.S. Pat. No. 4,613,901 to Gilhousen, et al. It will be appreciated by those skilled in the art that encryptor 20 is a one-way function.

The one way function comprises an encryption of a quantity 12 by the common intermediate key from combiner 16. Quantity 12 can comprise, for example, a variable known quantity such as the category epoch start time. Encryptor 20 outputs a common key 22 that is common to all sites. This result is achieved because the common data 18 and quantity 12 are the same for all sites. Common key 22 is encrypted with the base key 24 at encryptor 28, and the resultant encrypted common key 34 is stored in memory 38 for subsequent use.

Generating key 10 is also used to provide a distinct key 46 which is different for each site. This is achieved by combining the generating key with distinct data 42 at a combiner 40. The distinct data 42 can comprise, for example, program specific data that is different for the television programs transmitted by the different programmers in a subscription television system. Like combiner 16, combiner 40 can comprise any well known circuitry such as an XOR circuit. The combination of generating key 10 and distinct data 42 provides a distinct intermediate key that is output from combiner 40 and input to an encryptor 44. Encryptor 44 is a one way function that comprises an encryption of quantity 14 by the distinct intermediate key from combiner 40 to provide distinct key 46. Quantity 14 can comprise a known quantity such as a program epoch start time. Those skilled in the art will appreciate that any random or pseudorandom sequence can be used for the quantity 14.

Distinct key 46 is encrypted with base key 24 at encryptor 30, and the resultant encrypted distinct key 36 is stored in memory 38 for subsequent use.

Figure 2:
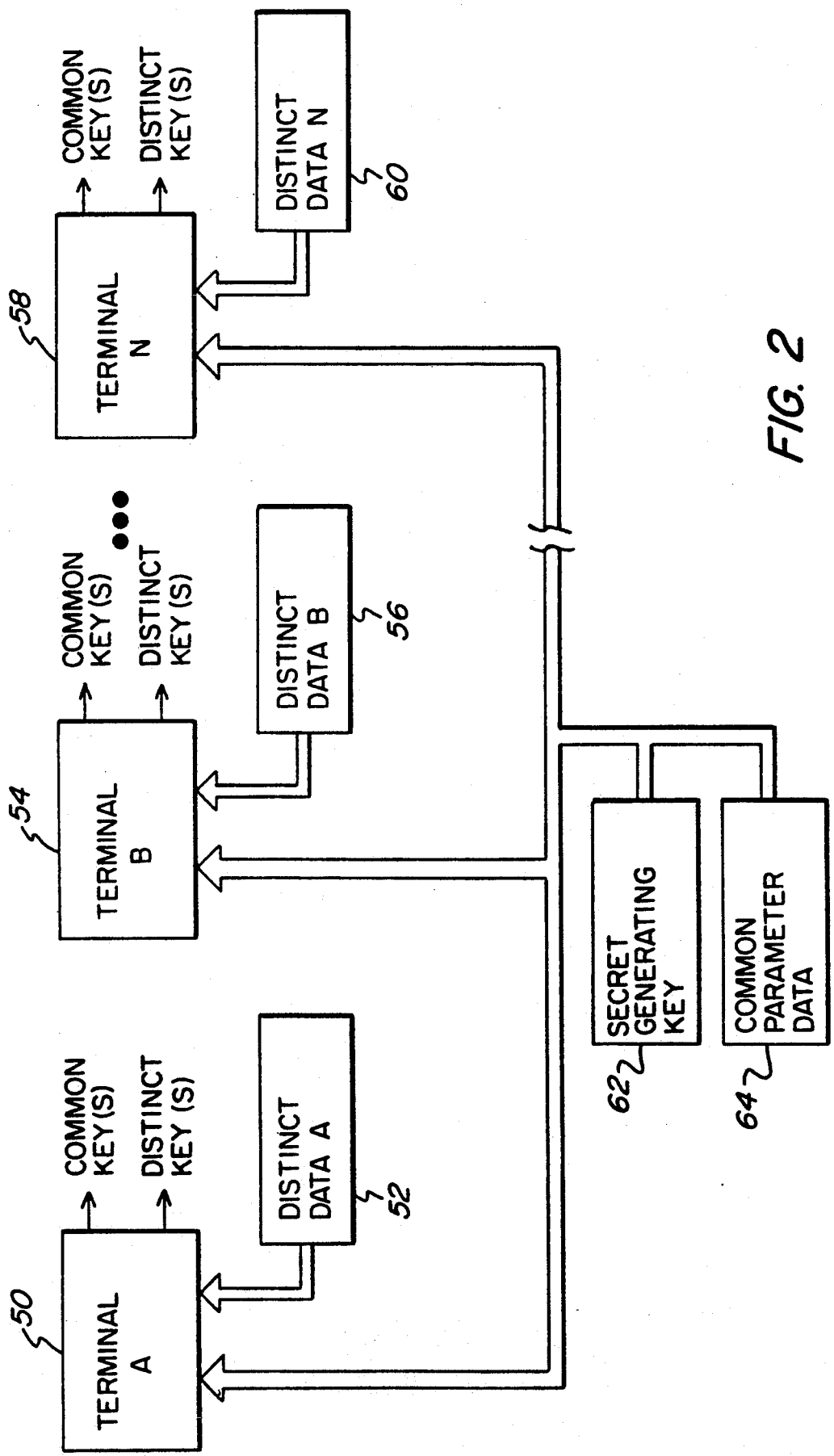
FIG. 2 is a block diagram illustrating a plurality of terminals at different sites in accordance with the present invention.

FIG. 2 illustrates a communications system using the present invention. A plurality of terminals 50, 54, 58 each contain the components illustrated in detail in FIG. 1. Terminal 50 receives distinct data 52 that is unique to the site, such as a satellite television programmer uplink, at which terminal 50 is installed. Terminal 50 is also initialized with a common secret generating key 62 and common parameter data 64 that is the same for all of the terminals in the system. As discussed above in connection with FIG. 1, terminal 50 uses the secret generating key 62 and distinct data 52 to produce one or more distinct keys unique to the terminal. The secret generating key 62 and common parameter data 64 are used by terminal 50 to generate one or more common keys that are common for all terminals in the system.

Terminal 54 is identical to terminal 50, except it receives different distinct data 56 for use in generating its distinct key(s). Similarly, terminal 58 is identical to terminals 50 and 54 except that it produces its unique distinct key(s) using distinct data 60 that is unique to terminal 58.

Common parameter data 64 can comprise a group of different sets of common parameter data for each terminal. By combining the secret generating key 62 with each set of common parameter data in each terminal, a group of different common intermediate keys that is the same for all sites can be provided. The group of different common intermediate keys can then be transformed in each terminal into a group of different common keys that is the same for all sites.

Similarly, a group of different sets of distinct parameter data can be provided for each terminal. By combining the generating key with each set of distinct parameter data, each terminal can provide a group of different distinct intermediate keys, which group is unique for each site. The group of different distinct intermediate keys in each terminal can then be transformed into a group of different distinct keys, which group is unique for each site.

In a preferred embodiment, a scheduling algorithm common to all of the terminals is provided to change the set of common parameter data from time to time. This enables system wide changes to the common keys to make it more difficult, for example, to break the security provided by the encryption systems using the keys. Preferably, when the set of common parameter data is changed system wide, steps will be taken to ensure that the new set of common parameter data is different from previous sets of such data used in the system. In this manner, efforts to defeat the system security by obtaining the common keys is frustrated by changing the common keys to new keys that have not previously existed in the system.

In a like manner, a first subset of distinct parameter data for each terminal can be changed from time to time. When this occurs, measures are taken to ensure that a second subset of the distinct parameter data at each terminal is not changed. In this manner, the uniqueness of at least the second subset of distinct parameter data is maintained for its associated site so that the distinct keys produced by each terminal will always remain unique to the terminal. By controlling the changing of the first subset of distinct parameter data to provide a new first subset of distinct parameter data that is different from previous first subsets, system security is enhanced. The changing of common parameter data and distinct parameter data as described above can be provided by a system controller that is common to all system components.

It should now be appreciated that the present invention provides a relatively simple system for generating common keys and distinct keys from the same common secret generating key. The system can be used to generate identical common keys (e.g., category keys) for the same categories at distributed sites. Different category keys are generated for different categories. At the same time, different distinct keys (e.g., program keys) are generated at different sites and during different programs. All keys are encrypted for storage by different base keys at different sites. The system has particular applicability to the provision of category and program keys in a satellite television scrambling system. The generating key is used to produce the same category key at all uplinks, and different program keys at each uplink.

Although the invention has been described in connection with an illustrated embodiment, those skilled in the art will appreciate that various adaptations and modifications may be made thereto, without departing from the spirit and scope of the invention as set forth in the following claims.

What is claimed is:

1. A method for locally generating common and distinct cryptographic keys at a plurality of sites comprising the steps of:

initializing a terminal for each site with a set of distinct parameter data unique to the site, a common secret generating key that is the same for all sites, and a set of common parameter data that is the same for all sites;

combining the generating key with the set of common parameter data in each terminal to provide a common intermediate key that is the same for all sites;

transforming the common intermediate key through a first one way function in each terminal into a common key that is the same for all sites;

combining the generating key with the set of distinct parameter data in each terminal to provide a distinct intermediate key that is unique for each site; and transforming the distinct intermediate key through a second one way function in each terminal into a distinct key that is unique for each site.

2. A method in accordance with claim 1 comprising the further steps of:

providing a group of different sets of common parameter data for each terminal;

combining said generating key with each set of common parameter data in each terminal to provide a group of different common intermediate keys that is the same for all sites; and transforming said group of different common intermediate keys in each terminal into a group of different common keys that is the same for all sites.

3. A method in accordance with claim 1 comprising the further steps of:

providing a group of different sets of distinct parameter data for each terminal;

combining said generating key with each set of distinct parameter data in each terminal to provide a group of different distinct intermediate keys that is unique for each site; and transforming said group of different distinct intermediate keys in each terminal into a group of different distinct keys that is unique for each site.

4. A method in accordance with claim 1 comprising the further step of:

changing the set of common parameter data in accordance with a scheduling algorithm common to all of said terminals.

5. A method in accordance with claim 4 comprising the further step of:

controlling said changing step to provide a new set of common parameter data that is different from previous sets.

6. A method in accordance with claim 4 comprising the further step of:

changing a subset of the distinct parameter data for each terminal.

7. A method in accordance with claim 6 comprising the further step of:

encrypting and storing at least one of said generating, common and distinct keys with a base key that is local to each site.

8. A method in accordance with claim 7 wherein each of said generating, common, and distinct keys is encrypted with said base key and stored.

9. A method in accordance with claim 8 wherein:

said first one way function comprises an encryption of a quantity by the common intermediate key in each terminal to provide said common key; and said second one way function comprises an encryption of a quantity by the distinct intermediate key in each terminal to provide said distinct key.

10. A method in accordance with claim 1 comprising the further step of:

changing a first subset of distinct parameter data for each terminal.

11. A method in accordance with claim 10 wherein a second subset of distinct parameter data at each terminal is not changed when the first subset is changed, to maintain said second subset unique for its associated site.

12. A method in accordance with claim 10 comprising the further step of:

controlling said changing step to provide a new first subset of distinct parameter data that is different from previous first subsets.

13. A method in accordance with claim 1 comprising the further step of:

encrypting and storing at least one of said generating, common and distinct keys with a base key that is local to each site.

14. A method in accordance with claim 13 wherein each of said generating, common, and distinct keys is encrypted with said base key and stored.

15. A method in accordance with claim 1 wherein:

said first one way function comprises an encryption of a quantity by the common intermediate key in each terminal to provide said common key; and said second one way function comprises an encryption of a quantity by the distinct intermediate key in each terminal to provide said distinct key.

16. Signal encryption apparatus for generating a common key and a distinct key from a secret generating key comprising:

first means for combining a secret generating key with a set of common parameter data to provide a common intermediate key;

first one way function means, coupled to receive said common intermediate key, for transforming the common intermediate key into a common key;

second means for combining said secret generating key with a set of distinct parameter data to provide a distinct intermediate key; and second one way function means, coupled to receive said distinct intermediate key, for transforming the distinct intermediate key into a distinct key.

17. Apparatus in accordance with claim 16 further comprising:
means for changing said common parameter data in accordance with a scheduling algorithm.

18. Apparatus in accordance with claim 16 wherein:
said first means combines a group of different sets of common parameter data with said generating key to provide a group of different common intermediate keys; and
said first one way function means transforms said group of different common intermediate keys into a group of different common keys.

19. Apparatus in accordance with claim 16 further comprising:
means for changing a subset of said distinct parameter data.

20. Apparatus in accordance with claim 16 further comprising:
means for encrypting and storing at least one of said generating, common and distinct keys with a base key that is local to each site.

21. Apparatus in accordance with claim 20 wherein each of said generating, common, and distinct keys is encrypted with said base key and stored.

22. Apparatus in accordance with claim 16 wherein:
said first one way function means encrypt a quantity by the common intermediate key to provide said common key; and
said second one way function means encrypt a quantity by the distinct intermediate key to provide said distinct key.

23. Apparatus in accordance with claim 16 wherein:
said second means combines a group of different sets of distinct parameter data with said generating key to provide a group of different distinct intermediate keys; and
said second one way function means transforms said group of different distinct intermediate keys into a group of different distinct keys.

* * * * *